United States Patent
Takeno et al.

(10) Patent No.: US 11,444,498 B2
(45) Date of Patent: Sep. 13, 2022

(54) VEHICLE ELECTRIC MOTOR

(71) Applicants: TOYOTA JIDOSHA KABUSHIKI KAISHA, Toyota (JP); AISIN AW CO., LTD., Anjo (JP)

(72) Inventors: Motoki Takeno, Nisshin (JP); Katsuhide Kitagawa, Seto (JP); Masaki Mori, Anjo (JP); Taketo Takeuchi, Anjo (JP)

(73) Assignees: TOYOTA JIDOSHA KABUSHIKI KAISHA, Toyota (JP); AISIN AW CO., LTD., Anjo (JP)

(*) Notice: Subject to any disclaimer, the term of this patent is extended or adjusted under 35 U.S.C. 154(b) by 188 days.

(21) Appl. No.: 16/852,427

(22) Filed: Apr. 18, 2020

(65) Prior Publication Data
US 2020/0336026 A1 Oct. 22, 2020

(30) Foreign Application Priority Data
Apr. 19, 2019 (JP) .............................. JP2019-080549

(51) Int. Cl.
*H02K 1/18* (2006.01)
*B60K 1/00* (2006.01)

(52) U.S. Cl.
CPC .............. *H02K 1/185* (2013.01); *B60K 1/00* (2013.01)

(58) Field of Classification Search
CPC .............. H02K 5/24; H02K 1/185; B60K 1/00
USPC .................................................. 310/216.049
See application file for complete search history.

(56) References Cited

U.S. PATENT DOCUMENTS

| | | | |
|---|---|---|---|
| 2009/0021104 A1 | 1/2009 | Hattori | |
| 2015/0022052 A1* | 1/2015 | Nobata | H02K 1/185 |
| | | | 310/216.135 |
| 2015/0130311 A1* | 5/2015 | Murakami | H02K 1/148 |
| | | | 310/89 |
| 2017/0141628 A1* | 5/2017 | Nose | H02K 1/278 |
| 2019/0036416 A1* | 1/2019 | Yamagishi | H02K 1/12 |
| 2019/0084407 A1* | 3/2019 | Takemoto | H02K 5/1732 |
| 2019/0386529 A1 | 12/2019 | Nose et al. | |

FOREIGN PATENT DOCUMENTS

| | | |
|---|---|---|
| EP | 3457541 A1 | 3/2019 |
| JP | 2007228725 A | 9/2007 |
| JP | 2007306751 A * | 11/2007 |

(Continued)

*Primary Examiner* — Alex W Mok
(74) *Attorney, Agent, or Firm* — Hunton Andrews Kurth LLP

(57) ABSTRACT

A vehicle electric motor including: a tubular-shaped stator core constituted by laminated steel sheets; a casing including an outer circumferential wall and a bottom wall, and storing therein an axial end portion of the stator core; a casing cover including an outer circumferential wall and a bottom wall, and storing therein another axial end portion of the stator core, and a rotor disposed inside the stator core. The stator core includes fastened portions protruding radially outwardly from respective portions of an outer circumferential surface of the stator core which are circumferentially spaced apart from each other. The stator core is fastened at the fastened portions to the bottom wall of one of the casing and the casing cover. The other of the casing and the casing cover includes protrusion portions protruding from its inner wall surface toward the stator core so as to restrain inclination of the stator core.

8 Claims, 6 Drawing Sheets

(56) References Cited

FOREIGN PATENT DOCUMENTS

| JP | 2008245352 A | * 10/2008 |
| JP | 2009012542 A | 1/2009 |
| JP | 2015136246 A | 7/2015 |
| JP | 2018074654 A | 5/2018 |

* cited by examiner

VEHICLE ELECTRIC MOTOR

CROSS-REFERENCE TO RELATED PATENT APPLICATION

This application claims priority from Japanese Patent Application No. 2019-080549 filed on Apr. 19, 2019, the disclosure of which is herein incorporated by reference in its entirety.

FIELD OF THE INVENTION

The present invention relates to a vehicle electric motor, more particularly, to a structure for supporting a stator core in the electric motor.

BACKGROUND OF THE INVENTION

There is known a vehicle electric motor including a cylindrical-shaped casing having a bottom wall, a cover connected to the casing, a tubular-shaped stator core fixed to the bottom wall of the casing and a rotor disposed inside the stator core and rotatably held by the casing and the cover, wherein the stator core is constituted by steel sheets which are provided by plate-shaped magnetic bodies made of material such as iron and ferroalloy and which are laminated on each other. For example, JP2007-228725A discloses, in paragraphs [0030] and [0040] of the specification and FIG. 8, an electric motor (rotating machine) for a hybrid vehicle, which includes a casing (220), a cover (230), a stator core (141) constituted by plate-shaped magnetic bodies that are laminated on each other, and a rotor (130), wherein the stator core (141) is held in a cantilever manner by the casing (220) through fasteners (143), and wherein the casing (220) includes a small inside-diameter portion in which the casing (220) is spaced apart from the stator core (141) by a relatively small spacing. JP2007-228725A further discloses, in paragraphs [0034] through [0036] of the specification and FIG. 12, for preventing vibrations of the stator core (141) from being transmitted to the casing (220), an inside diameter of a large inside-diameter portion of the casing (220) is set to be sufficiently large such that the stator core (141) is not brought into contact with the large inside-diameter portion of the casing (220) even when the an angle (θ) of inclination of the stator core (141) is maximized.

SUMMARY OF THE INVENTION

By the way, in the electric motor as described above, it is considered that the inclination of the stator core is restrained on a casing side, specifically, the inclination of the stator core is restrained by the small inside-diameter portion of the casing, wherein the small inside-diameter portion is close to an outer circumferential surface of the stator core over its entire periphery. It might be possible to employ an arrangement in which the inclination of the stator core on a cover side is restrained on the cover side rather than on the casing side, specifically, the inclination of the stator core on the cover side is restrained by a small inside-diameter portion which is provided in the cover and which is close to the outer circumferential surface of the stator core over its entire periphery. However, in this arrangement, a space, which is located radially outside the stator core on the cover side, would be narrow so that it is difficult to provide terminals such as coil terminal and neutral line terminal in the narrow space.

The present invention was made in view of the background art described above. It is therefore an object of the present invention to provide a vehicle electric motor that is capable of restraining inclination of a stator core on a side of an axial end portion of the stator core while assuring a sufficient space on the side of the axial end portion of the stator core.

The above object is achieved according to the following aspects of the present invention.

According to a first aspect of the invention, there is provided a vehicle electric motor comprising: a tubular-shaped stator core constituted by a plurality of steel sheets that are laminated on each other; a casing including an outer circumferential wall and a bottom wall, and storing therein one of opposite end portions of the stator core which are opposite to each other in an axial direction of the stator core; a casing cover including an outer circumferential wall and a bottom wall, and storing therein the other of the opposite end portions of the stator core, the casing cover being fixed to the casing; and a rotor disposed inside the stator core so as to be rotated about an axis of the stator core, wherein the stator core includes a plurality of fastened portions provided in respective portions of an outer circumferential surface of the stator core which are spaced apart from each other in a circumferential direction of the stator core, the fastened portions protruding outwardly in a radial direction of the stator core, the stator core being fastened at the fastened portions to the bottom wall of one of the casing and the casing cover, through fastening bolts that pass through the fastened portions in the axial direction, and wherein the other of the casing and the casing cover includes a plurality of protrusion portions provided in respective portions of an inner wall surface of the other of the casing and the casing cover which surround the stator core, the protrusion portions protruding toward the stator core so as to restrain the stator core from being inclined in directions away from the axis toward the fastened portions. The protrusion portions may include at least two protrusion portions each of which is located to be adjacent to a corresponding one of the fastened portions in the circumferential direction or each of which is located to be adjacent and opposed to the corresponding one of the fastened portions in the radial direction, such that a circumferential distance between each of the at least two protrusion portions and the corresponding one of the fastened portions in the circumferential direction is not larger than a value corresponding to one-third of an angular interval between the corresponding one of the fastened portions and another one of the fastened portions that are adjacent to each other in the circumferential direction. It is noted that, for example, the one of the casing and the casing cover is the casing while the other of the casing and the casing cover is the casing cover.

According to a second aspect of the invention, in the electric motor according to the first aspect of the invention, the protrusion portions includes a protrusion portion that is located, in the circumferential direction, between adjacent two of the fastened portions which are adjacent to each other in the circumferential direction, such that the protrusion portion is located in a given angular range from one of the adjacent two of the fastened portions in the circumferential direction, the given angular range corresponding to one-third of an angular interval between the adjacent two of the fastened portions in the circumferential direction.

According to a third aspect of the invention, in the electric motor according to the first or second aspect of the invention, each of the protrusion portions is to be brought into contact at a distal end thereof with the outer circumferential surface of the stator core, and is located in a position that enables the each of the protrusion portions to be brought into contact at the distal end thereof with a contact portion of the outer circumferential surface of the stator core, the contact portion being located, in the circumferential direction, between a corresponding one of the fastened portions and a center position that is located, in the circumferential direction, between the corresponding one of the fastened portions and another one of the fastened portions that is adjacent, in the circumferential direction, to the corresponding one of the fastened portions.

According to a fourth aspect of the invention, in the electric motor according to one of the first through third aspects of the invention, the protrusion portions are provided to restrain the stator core from being inclined in any of the directions away from the axis toward the fastened portions, such that the stator core is restrained, by at least one of the protrusion portions, from being inclined in each of the directions away from the axis toward the fastened portions.

According to a fifth aspect of the invention, in the electric motor according to any one of the first through fourth aspects of the invention, the protrusion portions include a pair of protrusion portions that are provided in respective opposite sides of each of the fastened portions in the circumferential direction, such that the pair of protrusion portions are located in respective positions that are symmetrical with each other with respect to the each of the fastened portions in the circumferential direction.

According to a sixth aspect of the invention, in the electric motor according to any one of the first through fifth aspects of the invention, the protrusion portions include a pair of protrusion portions that are provided, in the circumferential direction, between each adjacent two of the fastened portions which are adjacent to each other in the circumferential direction, such that the pair of protrusion portions are located in respective positions that are symmetrical with each other with respect to a line connecting between the axis and a center position that is located, in the circumferential direction, between the each adjacent two of the fastened portions.

According to a seventh aspect of the invention, in the electric motor according to any one of the first through fourth aspects of the invention, each of the protrusion portions is to be brought into contact at a distal end thereof with a corresponding one of the fastened portions so as to restrain the stator core from being inclined.

According to the first aspect of the invention, the vehicle electric motor comprises: a tubular-shaped stator core constituted by a plurality of steel sheets that are laminated on each other; a casing including an outer circumferential wall and a bottom wall, and storing therein one of opposite end portions of the stator core which are opposite to each other in an axial direction of the stator core; a casing cover including an outer circumferential wall and a bottom wall, and storing therein the other of the opposite end portions of the stator core, the casing cover being fixed to the casing; and a rotor disposed inside the stator core so as to be rotated about an axis of the stator core, wherein the stator core includes a plurality of fastened portions provided in respective portions of an outer circumferential surface of the stator core which are spaced apart from each other in a circumferential direction of the stator core, the fastened portions protruding outwardly in a radial direction of the stator core, the stator core being fastened at the fastened portions to the bottom wall of one of the casing and the casing cover, through fastening bolts that pass through the fastened portions in the axial direction, and wherein the other of the casing and the casing cover includes a plurality of protrusion portions provided in respective portions of an inner wall surface of the other of the casing and the casing cover which surround the stator core, the protrusion portions protruding toward the stator core so as to restrain the stator core from being inclined in directions away from the axis toward the fastened portions. Owing to the above-described construction, it is possible to effectively restrain, by the plurality of protrusion portions, the inclination of the stator core in the directions away from the axis toward the respective fastened portions (to each of which an axial force is to be applied from a corresponding one of the fastening bolts), which could be a large inclination. Further, in place of providing the above-described other of the casing and the casing cover with a protrusion portion that is closed to the outer circumferential surface of the stator core over its entire periphery, the plurality of protrusion portions can be provided in respective effective positions, so that it is possible to assure a sufficient space between the other of the casing and the casing cover and the above-described other of the opposite end portions of the stator core. Therefore, it is possible to maintain a high degree of freedom in arrangement of terminals such as coil terminal and neutral line terminal that are required for the stator oil.

According to the second aspect of the invention, the protrusion portions includes a protrusion portion that is located, in the circumferential direction, between adjacent two of the fastened portions which are adjacent to each other in the circumferential direction, such that the protrusion portion is located in a given angular range from one of the adjacent two of the fastened portions in the circumferential direction, the given angular range corresponding to one-third of an angular interval between the adjacent two of the fastened portions in the circumferential direction. Owing to this arrangement, it is possible to effectively restrain, the inclination of the stator core in a direction away from the axis toward the above-described one of the adjacent two of the fastened portions (to which the axial force is to be applied from a corresponding one of the fastening bolts) can be effectively restrained by the protrusion portion.

According to the third aspect of the invention, each of the protrusion portions is to be brought into contact at a distal end thereof with the outer circumferential surface of the stator core, and is located in a position that enables the each of the protrusion portions to be brought into contact at the distal end thereof with a contact portion of the outer circumferential surface of the stator core, the contact portion being located, in the circumferential direction, between a corresponding one of the fastened portions and a center position that is located, in the circumferential direction, between the corresponding one of the fastened portions and another one of the fastened portions that is adjacent, in the circumferential direction, to the corresponding one of the fastened portions. Owing to this arrangement, it is possible to effectively restrain the inclination of the stator core in the directions away from the axis toward the respective fastened portions (to each of which the axial force is to be applied from a corresponding one of the fastening bolts) can be effectively restrained by the protrusion portions. Further, it is possible to assure a sufficient space between the above-described other of the casing and the casing cover and the above-described other of the opposite end portions of the stator core, and accordingly to maintain a high degree of freedom in arrangement of terminals such as coil terminal and neutral line terminal that are required for the stator oil.

According to the fourth aspect of the invention, the protrusion portions are provided to restrain the stator core from being inclined in any of the directions away from the axis toward the fastened portions, such that the stator core is restrained, by at least one of the protrusion portions, from being inclined in each of the directions away from the axis toward the fastened portions. Owing to this arrangement, it is possible to effectively restrain the inclination of the stator core in any of the directions away from the axis toward the respective fastened portions (to each of which the axial force is to be applied from a corresponding one of the fastening bolts) can be effectively restrained by the protrusion portions.

According to the fifth aspect of the invention, the protrusion portions include a pair of protrusion portions that are provided in respective opposite sides of each of the fastened portions in the circumferential direction, such that the pair of protrusion portions are located in respective positions that are symmetrical with each other with respect to the each of the fastened portions in the circumferential direction. Owing to this arrangement, it is possible to effectively restrain the inclination of the stator core in each one of the directions away from the axis toward the respective fastened portions (to each of which the axial force is to be applied from a corresponding one of the fastening bolts) can be effectively restrained by the corresponding pair of protrusion portions.

According to the sixth aspect of the invention, the protrusion portions include a pair of protrusion portions that are provided, in the circumferential direction, between each adjacent two of the fastened portions which are adjacent to each other in the circumferential direction, such that the pair of protrusion portions are located in respective positions that are symmetrical with each other with respect to a line connecting between the axis and a center position that is located, in the circumferential direction, between the each adjacent two of the fastened portions. Owing to this arrangement, it is possible to effectively restrain the inclination of the stator core in each one of the directions away from the axis toward the respective fastened portions (to each of which the axial force is to be applied from a corresponding one of the fastening bolts) can be effectively restrained by the corresponding pair of protrusion portions.

According to the seventh aspect of the invention, each of the protrusion portions is to be brought into contact at a distal end thereof with a corresponding one of the fastened portions so as to restrain the stator core from being inclined. Owing to this arrangement, it is possible to effectively restrain the inclination of the stator core in each one of the directions away from the axis toward the respective fastened portions (to each of which the axial force is to be applied from a corresponding one of the fastening bolts) can be effectively restrained by the corresponding one of the protrusions.

DETAILED DESCRIPTION OF PREFERRED EMBODIMENTS

Hereinafter, some embodiments of the invention will be described in detail with reference to the accompanying drawings. It is noted that figures of the drawings are simplified or deformed as needed, and each portion is not necessarily precisely depicted in terms of dimension ratio, shape, etc.

First Embodiment

Figure 1:
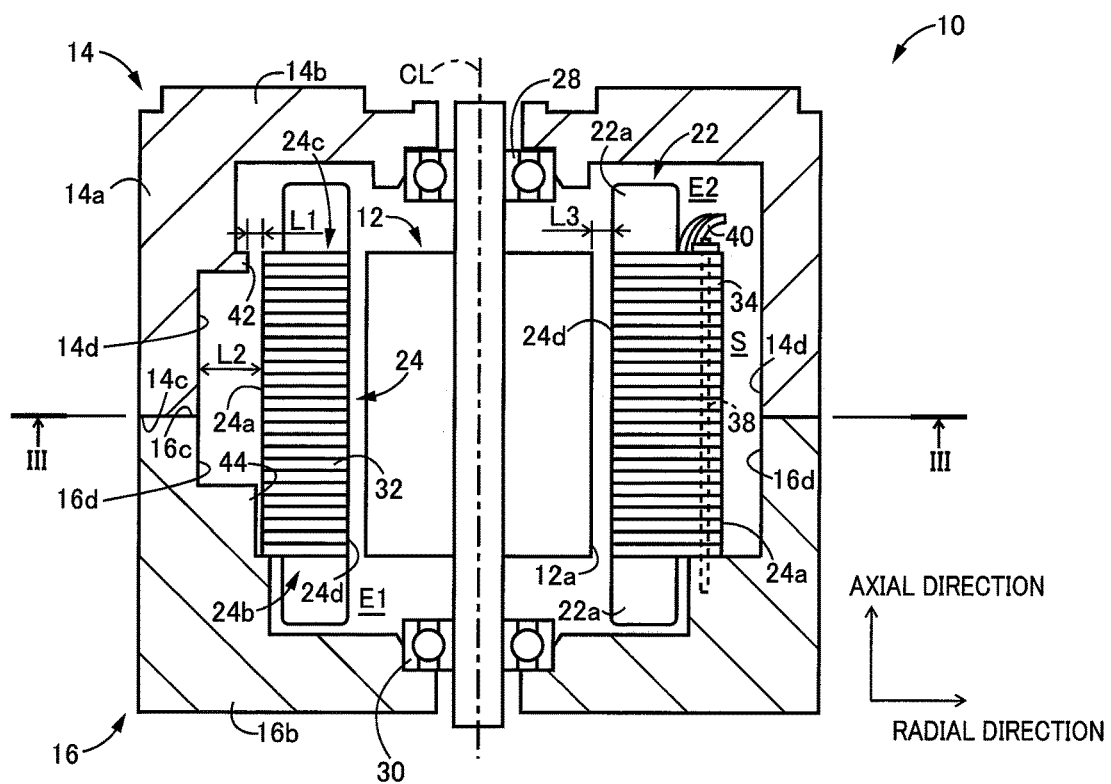
FIG. 1 is a view schematically showing a vehicle electric motor according to an embodiment of the present invention, wherein the view is a cross sectional view taken in a plane containing an axis about which a rotor of the electric motor is to be rotated.

FIG. 1 is a view schematically showing a vehicle electric motor 10 constructed according to a first embodiment of the present invention, wherein the view is a cross sectional view taken in a plane containing an axis (centerline) CL about which a rotor 12 of the electric motor 10 to be rotated. As shown in FIG. 1, the electric motor 10 includes, in addition to the rotor 12, a casing cover 14, a casing 16 and a stator core 24 on which a stator coil 22 is wound. The cover 14 has a generally tubular shape, and includes a bottom wall 14b and an outer circumferential wall 14a that extends axially from the bottom wall 14b. The bottom wall 14b has a bearing-fitting hole in which a bearing 28 is fitted. The casing 16 has a generally tubular shape, and includes a bottom wall 16b and an outer circumferential wall 16a that extends axially from the bottom wall 16b. The bottom wall 16b has a bearing-fitting hole in which a bearing 30 is fitted.

The stator core 24 is disposed inside the tubular-shaped cover 14 and casing 16, and is constituted by a plurality of steel plates or sheets 32 that are laminated on each other. Each of the steel sheets 32 is covered with an electrically insulated layer in the form of an oxide film, such that the steel sheets 32 are electrically insulated from one another. The stator core 24 is spaced apart from the cover 14 with a spacing S between an outer circumferential surface 24a of the stator core 24 and an inner wall surface 14d of the outer circumferential wall 14a in a radial direction of the electric motor 10, i.e., in a radial direction of the stator core 24. The stator core 24 includes a plurality of fastened portions 34 provided in respective portions of the outer circumferential surface 24a of the stator core 24 which are spaced apart from each other in a circumferential direction R (see FIG. 3) of the stator core 24. The fastened portions 34 protrude from the respective portions of the outer circumferential surface 24a of the stator core 24 having a generally tubular shape, outwardly in a radial direction of the stator core 24. The stator core 24 is fixed or fastened at the fastened portions 34 to the bottom wall 16b through fastening bolts 38 that passes through the fastened portions 34 in an axial direction of the stator core 24. In the present embodiment, as described later, the fastened portions 34 consist of three fastened portions 34 which are provided in respective three portions of the outer circumferential surface 24a of the stator core 24 and which are equi-angularly spaced apart from each other at an angular interval of 120° (see FIG. 3).

The cover 14 and the casing 16 are fixed to each other through a plurality of fastening bolts (not shown), such that the stator core 24 is disposed radially inside the tubular-shaped cover 14 and casing 16, with an axial end portion (i.e., one of opposite end portions in the axial direction of the stator core 24 or the electric motor 10) 24b of the stator core 24 being disposed radially inside the casing 16 and with an another axial end portion (i.e., the other of the opposite end portions in the axial direction) 24c being radially disposed inside the cover 14. The outer circumferential wall 14a of the cover 14 has a distal end surface that serves as a mating surface 14c, while the outer circumferential wall 16a of the casing 16 has a distal end surface that serves as a mating surface 16c. When the cover 14 and the casing 16 are fixed to each other, the mating surfaces 14c, 16c are located in respective positions that overlap with the stator core 24 in the radial direction of the electric motor 10, and are brought into contact with each other so as to be attached to each other. As shown in FIG. 1, the above-described radial direction is a direction perpendicular to the axis CL while the above-described axial direction is a direction parallel to the axis CL.

The stator coil 22 has, in its axial end portions, coil ends 22a, one of which is located in a space E1 that is defined between the casing 16 and the axial end portion 24b of the stator core 24, and the other of which is located in a space E2 that is defined between the cover 14 and the other axial end portion 24c of the stator core 24. In the space E2, terminals 40 such as coil terminal and neutral line terminal are disposed.

Inside the tubular-shaped stator core 24, the rotor 12 is disposed such that the axis CL of the rotor 12 and an axis (centerline) CL of an inner circumferential surface 24d of the stator core 24 are aligned with each other. The rotor 12 is held at its axially opposite end portions by the cover 14 and the casing 16 through bearings 28, 30, so as to rotatable about the axis CL of the rotor 12. The electric motor 10, which is constructed as described above, is, for example, an AC synchronous motor in which the rotor 12 storing therein a permanent magnet is driven or rotated owing to a rotating magnetic field that is formed by supply of 3-phase AC current to the stator coil 22. It is noted that the other axial end portion 24c of the stator core 24 is fixed neither to the cover 14 nor to the casing 16. That is, the stator core 24 is supported by the casing 16 in a cantilever manner, namely, the stator core 24 is fixed, only at its axial end portion 24b on the side of the casing 16, to the bottom wall 16b of the casing 16.

The cover 14 includes a plurality of protrusion portions 42 provided in respective portions of the inner wall surface 14d of the cover 14 which surround the stator core 24. The protrusion portions 42 protrude from the inner wall surface 14d of the cover 14 toward the outer circumferential surface 24a of the stator core 24. In the present embodiment, the plurality of protrusion portions 42 consist of four protrusion portions 42a, 42b, 42c, 42d (hereinafter simply referred to as "protrusion portions 42" unless they are to be distinguished from one another).

The casing 16 is provided with a stator-core positioning portion 44 that protrudes from an inner wall surface 16d of the casing 16 toward the outer circumferential surface 24a of the stator core 24. The stator-core positioning portion 44 corresponds to a circumferentially-continuous protrusion portion which is provided in the casing 16, which facilitates the axial end portion 24b of the stator core 24 to be positioned in a predetermined position relative to the bottom wall 16b of the casing 16 when the stator core 24 is to be fastened to the casing 16 through the plurality of fastening bolts 38.

Figure 2:
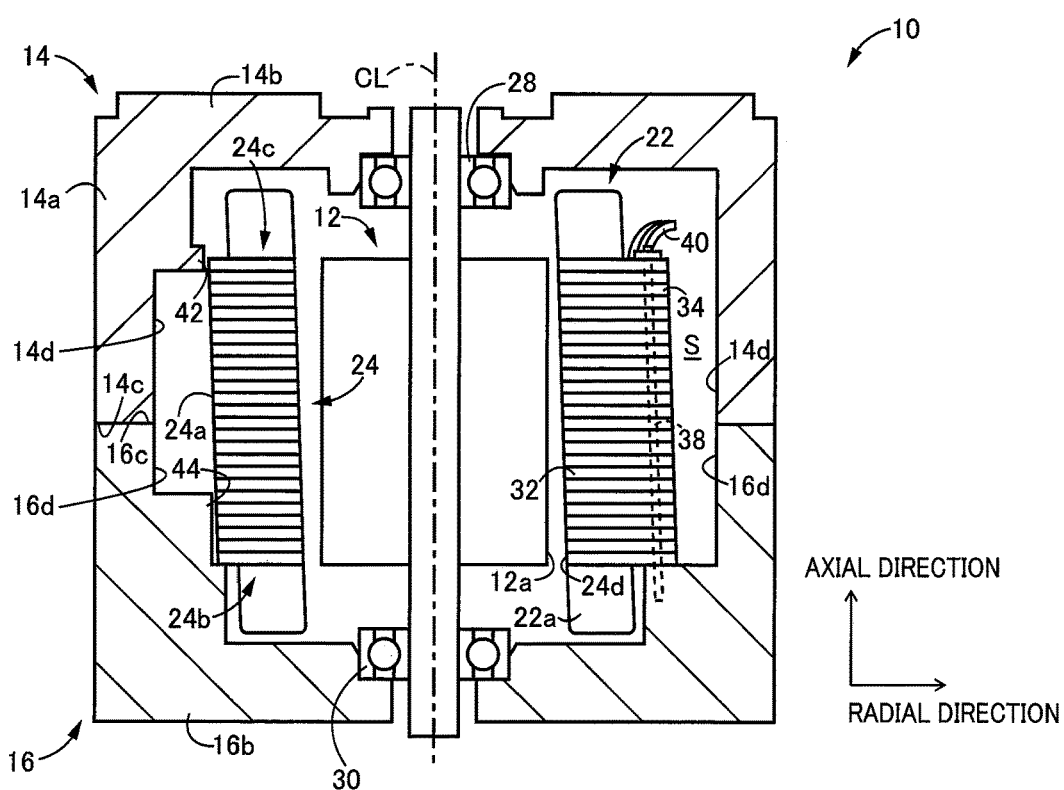
FIG. 2 is a view schematically showing the vehicle electric motor of FIG. 1 when the stator core is inclined.

FIG. 2 is a view schematically showing the electric motor 10 in a state in which the stator core 24 is inclined or falls down. As shown in FIG. 2, when the stator core 24 is inclined, the stator core 24 is brought into contact at its outer circumferential surface 24a with the protrusion portions 42 provided in the cover 14, so that the inclination of the stator core 24 is restrained, namely, the stator core 24 is avoided from being further inclined.

Referring back to FIG. 1, "L1" indicates a distance between each protrusion portion 42 and the outer circumferential surface 24a of the stator core 24 in the radial direction, "L2" indicates a distance between the inner wall surface 14d of the cover 14 and the outer circumferential surface 24a of the stator core 24 in the radial direction, and "L3" indicates a distance between the inner circumferential surface 24d of the stator core 24 and an outer circumferential surface 12a of the rotor 12 in the radial direction. When the stator core 24 is not inclined, namely, when the axis CL of the inner circumferential surface 24d of the stator core 24 is aligned with the axis CL of the rotor 12, the distance L1 is shorter than the distance L2 and is shorter than the distance L3.

Figure 3:
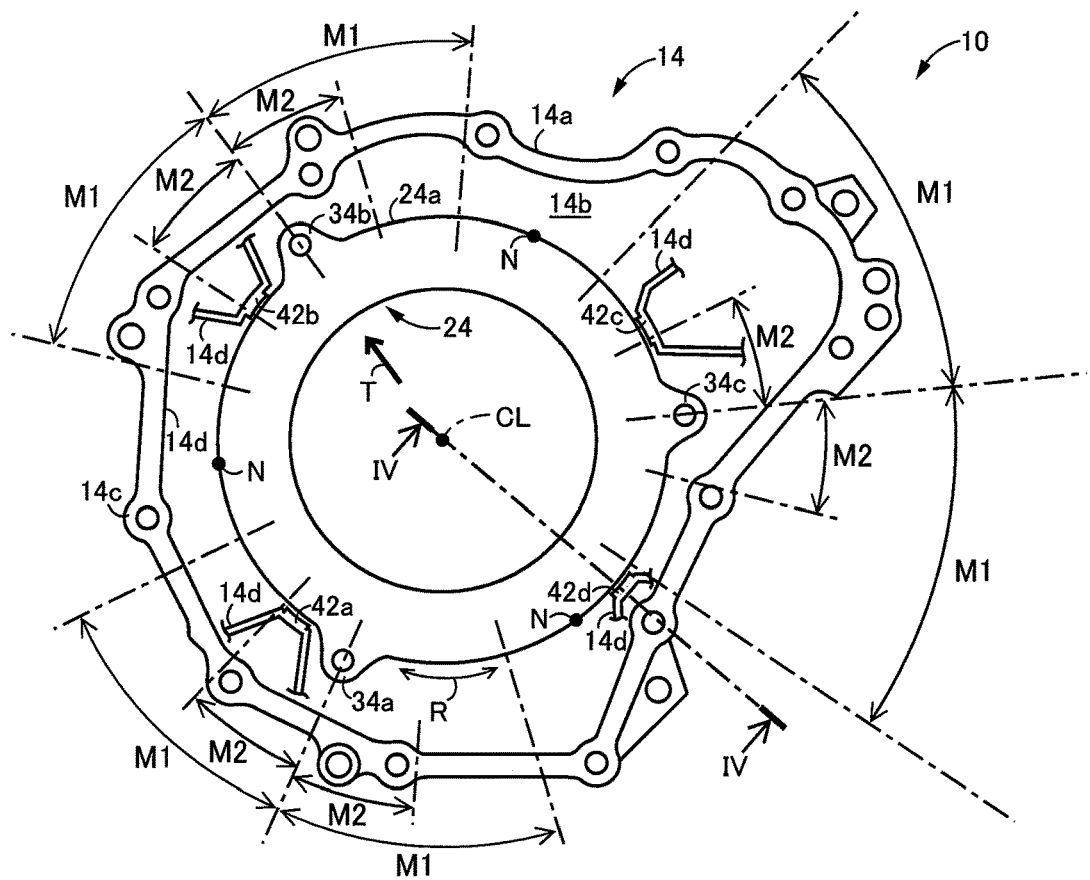
FIG. 3 is a transverse sectional view of the vehicle electric motor of FIG. 1, showing a cross section taken along line III-III indicated in FIG. 1.
Figure 4:
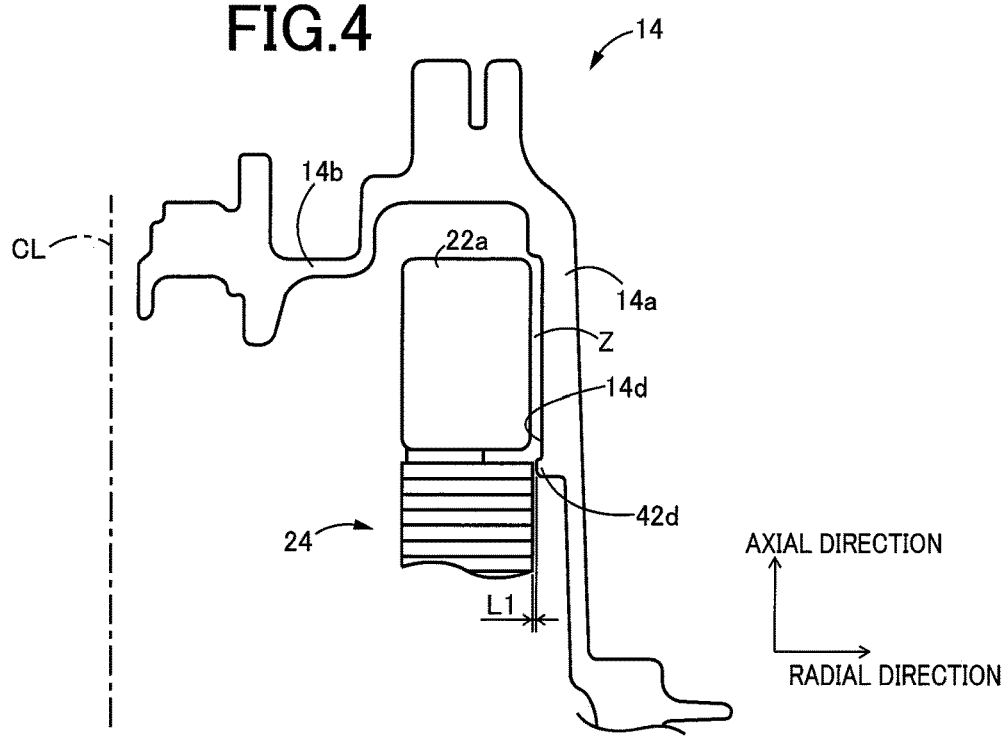
FIG. 4 is a longitudinal sectional view showing, in enlargement, a part of a cross section taken along line IV-IV indicated in FIG. 3.

FIG. 3 is a transverse sectional view of the electric motor 10, showing a cross section taken along line indicated in FIG. 1. FIG. 4 is a longitudinal sectional view showing, in enlargement, a part of a cross section taken along line IV-IV indicated in FIG. 3. It is noted that the rotor 12 and the fastening bolts 38 are not illustrated in FIGS. 3 and 4. As shown in FIG. 3, the three fastened portions 34a, 34b, 34c (hereinafter simply referred to as "fastened portions 34" unless they are to be distinguished from one another) are provided on the outer circumferential surface 24a of the stator core 24 and are arranged in the circumferential direction R around the axis CL. The fastened portions 34 are equi-angularly spaced apart from each other at the angular interval of 120°. Meanwhile, the plurality of protrusion portions 42a, 42b, 42c, 42d provided in the cover 14 protrude, from respective portions of the inner wall surface 14d of the cover 14, which surround the stator core 24, toward the stator core 24.

Among the four protrusion portions 42a, 42b, 42c, 42d, the three protrusion portions 42a, 42b, 42c are located in respective positions, which are adjacent to the respective fastened portions 34 in the circumferential direction R. Specifically, each of the three protrusion portions 42a, 42b, 42c is provided, in the circumferential direction R, between corresponding adjacent two of the fastened portions 34 which are adjacent to each other in the circumferential direction R, and is located in a given angular range M1 on the inner wall surface 14d, as shown in FIG. 3. The given angular range M1 is an angular range from one of the corresponding adjacent two of the fastened portions 34 in the circumferential direction R, and corresponds to one-third (⅓) of the angular interval between the corresponding adjacent two of the fastened portions 34 in the circumferential direction R. In other words, the given angular range M1 is one of three angular ranges into which the angular interval of 120° between the adjacent two fastened portions 34 is equally divided, and the one of the angular ranges is adjacent to one of the adjacent two fastened portions 34. That is, each of the three protrusion portions 42a, 42b, 42c is located in the given angular range M1 of 40° (=120°/3) from a line passing through the axis CL and a center of a through-hole (through which the fastening bolt 38 passes) of the one of the adjacent two fastened portions 34.

Further, as shown in FIG. 3, each of the three protrusion portions 42a, 42b, 42c is provided at least partially in a given angular range M2 on the inner wall surface 14d, wherein the given angular range M2 is an angular range from one of the corresponding adjacent two of the fastened portions 34 in the circumferential direction R, and corresponds to one-sixth (⅙) of the angular interval between the corresponding adjacent two of the fastened portions 34 in the circumferential direction R. That is, in the present embodiment, each of the three protrusion portions 42a, 42b, 42c is provided at least partially in the given angular range M2 of 20° (=120°/6) from the one of the adjacent two fastened portions 34.

In FIG. 3, "T" indicates a direction away from the axis CL toward the fastened portion 34b that is one of the three fastened portions 34a, 34b, 34c. That is, the direction indicated by "T" in FIG. 3 is one of three directions (hereinafter referred to as "directions T") from the axis CL toward the respective three fastened portions 34a, 34b, 34c. The three protrusion portions 42a, 42b, 42c are provided to protrude from the inner wall surface 14d of the cover 14, such that the protrusion portion 42a is configured to restrain the stator core 24 from being inclined in one of the directions T which is a direction away from the axis CL toward the fastened portions 34a, such that the protrusion portion 42b is configured to restrain the stator core 24 from being inclined in one of the directions T which is a direction away from the axis CL toward the fastened portions 34b, and such that the protrusion portion 42c is configured to restrain the stator core 24 from being inclined in one of the directions T which is a direction T away from the axis CL toward the fastened portions 34c. It is noted that any one of the four protrusion portions 42a, 42b, 42c, 42d is not provided in a position in which the protrusion portion 42 is to be brought at its distal end with a center position N that is located between each adjacent two fastened portions 34 in the circumferential direction R.

As shown in FIG. 4, the above-described portions of the inner wall surface 14d in which the protrusion portions 42 are provided are opposed to the stator core 24 in the axial direction. That is, the protrusion portions 42 are not provided in portions of the inner wall surface 14d which are opposed to an outer circumferential surface of each of the coil ends 22a in the axial direction, so as to assure an insulation clearance Z. The coil end 22a is not constant in outside diameter in its entire periphery, and the outside diameter of the coil end 22a varies depending on a manner of coil winding thereon, so that the outside diameter of the coil end 22a could be at least partially larger than an outside diameter of the stator core 24. Therefore, there could be a case in which a required insulation distance between the coil end 22a and the cover 14 is larger than a required insulation distance between the stator core 24 and the cover 14 in the radial direction. However, in the present embodiment, since the protrusion portions 42 are not provided in portions of the inner wall surface 14d which are opposed to the outer circumferential surface of the coil end 22a, a sufficient amount of the insulation clearance Z can be assured between the coil end 22a and the cover 14.

Figure 9:
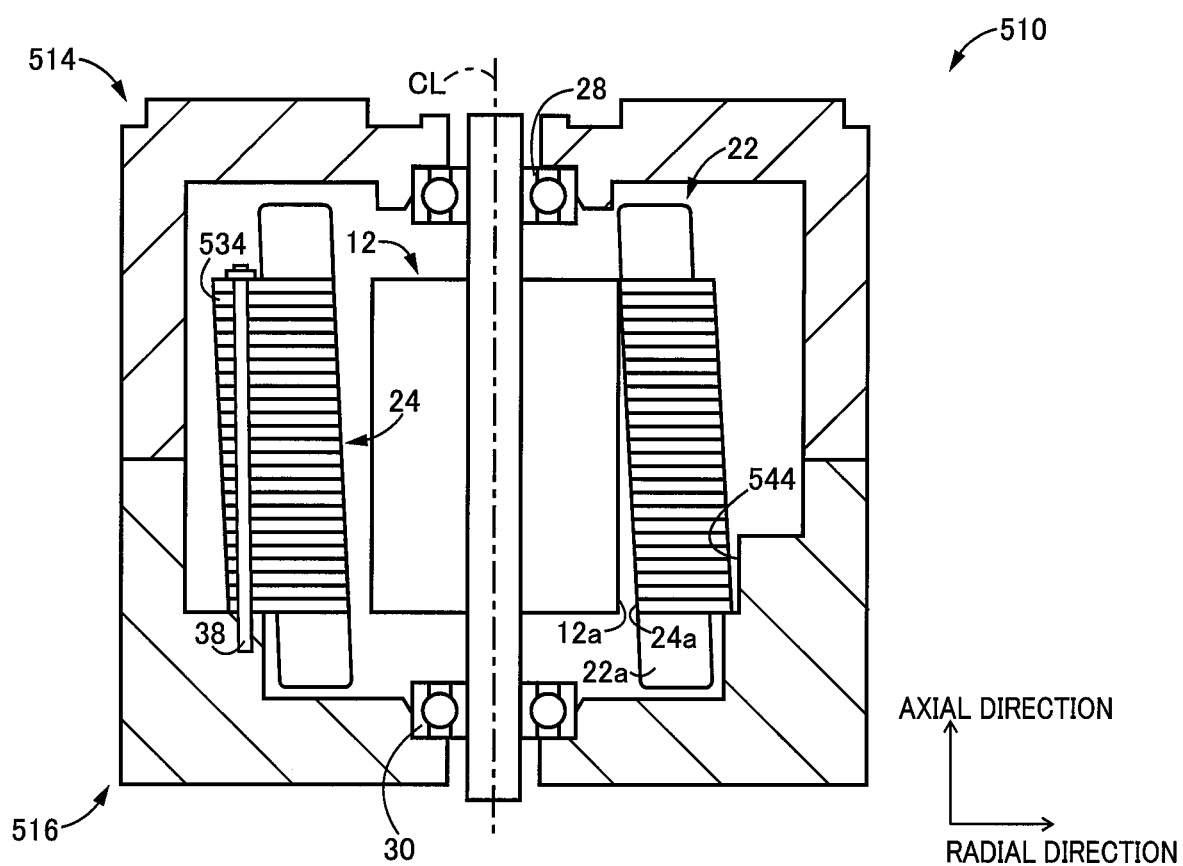
FIG. 9 is a view showing a vehicle electric motor as a comparative example in which protrusion portions are not provided on a cover side.

FIG. 9 is a view of an electric motor 510 as a comparative example in which the protrusion portions 42 are not provided on a cover 514 of the electric motor 510, and shows a state in which the stator core 24 is inclined. As shown in FIG. 9, in the electric motor 510, the stator core 24 is fixed directly to a bottom wall of a casing 516 through the plurality of fastening bolts 38, but is not fixed directly to the cover 514. Therefore, where the electric motor 510 is installed in a vehicle so as to lie horizontally with the axis CL extending in a horizontal direction, the stator core 24 could be inclined because the stator core 24 is supported in a cantilever manner only by the side of the casing 516. Further, when an electromagnetic force is large or when the electric motor 510 is caused to shake by vibration caused by vibration, shock or other external force applied during running of the vehicle, the stator core 24 could be bent so as to be inclined. For example, if these inclinations are combined with each other, excessively large inclination of the stator core 24 would be caused whereby the inner circumferential surface of the stator core 24 would be displaced toward the outer circumferential surface of the rotor 12 on the side of the cover 514, thereby causing a risk that the stator core 24 would be excessively close to the rotor 12 or would interfere with the rotor 12 in the electric motor 510.

It is considered that the excessively large inclination of the stator core 24 would be more likely to be caused, particularly, where the length of the stator core 24 is large in a direction of the axis CL, the diameter of the stator core 24 is small and the length of a stator-core positioning portion 544 provided inside the casing 516 is small in the direction of the axis CL. Further, when the stator core 24 is to be fastened to the casing 516 through the fastening bolts 38, there is a probability that the stator core 24 would be inclined in a direction toward one of the fastened portions 534, due to force applied to fasten the stator core 24 to the casing 516 or assemble the electric motor 510 and/or due to variation of a thickness of each of the steel sheets laminated on each other.

However, in the present embodiment, as shown in FIG. 1, when the stator core 24 is not inclined, the distance L1 between each protrusion portion 42 of the cover 14 and the outer circumferential surface 24a of the stator core 24 in the radial direction is shorter than the distance L3 distance between the inner circumferential surface 24d of the stator core 24 and the outer circumferential surface 12a of the rotor 12 in the radial direction. Therefore, before the inner circumferential surface 24d of the stator core 24 is brought into contact with the outer circumferential surface 12a of the rotor 12, the stator core 24 is brought into contact at the outer circumferential surface 24a with one of the protrusion portions 42, so that it is possible to restrain inclination of the stator core 24 and to reduce the risk of the contact of the stator core 24 with the rotor 12.

In the space E2 (see FIG. 1) defined between the cover 14 and the above-described other axial end portion 24c of the stator core 24, the coil end 22a and the terminals 40 such as coil terminal and neutral line terminal are provided. Therefore, if a protrusion portion were provided on the inner wall surface 14d of the cover 14 to extend circumferentially over the entire periphery of the inner wall surface 14d, for restraining inclination of the stator core 24 in all directions, the space E2 would be narrow so that it is difficult provide the terminals 40 in the narrow space. However, in the present embodiment, the inclination of the stator core 24 is restrained by the plurality of protrusion portions 42 that are spaced apart from each other in the circumferential direction R, rather than by a protrusion portion that extends circumferentially over the entire periphery of the inner wall surface 14d of the cover 14. The plurality of protrusion portions 42 are provided to restrain the stator core 24 from being inclined in the respective directions T away from the axis CL toward the respective fastened portions 34. Thus, the inclination of the stator core 24 is restrained while the space E2 between the stator core 24 and the cover 14 is assured.

As described above, in the present embodiment, the electric motor 10 includes: the tubular-shaped stator core 24 constituted by the plurality of steel sheets 32 that are laminated on each other; the casing 16 including the outer circumferential wall 16a and the bottom wall 16b, and storing therein the axial end portion 24b of the stator 24; the cover 14 fixed to the casing 16, including the outer circumferential wall 14a and the bottom wall 14b, and storing therein the other axial end portion 24c of the stator core 24; and the rotor 12 disposed inside the stator core 24 so as to be rotated about the axis (centerline) CL of the stator core 24. The stator core 24 includes the plurality of fastened portions 34a, 34b, 34c provided in the respective portions of the outer circumferential surface 24a of the stator core 24 which are spaced apart from each other in the circumferential direction R of the stator core 24. The fastened portions 34a, 34b, 34c protrude outwardly in the radial direction of the stator core 24. The stator core 24 is fastened at the fastened portions 34a, 34b, 34c to the bottom wall 16b of the casing 16 through the fastening bolts 38 that pass through the respective fastened portions 34a, 34b, 34c in the axial direction. The cover 14 includes the plurality of protrusion portions 42a, 42b, 42c, 42d provided in the respective portions of the inner wall surface 14d of the cover 14 which surround the stator core 24. The protrusion portions 42a, 42b, 42c, 42d protrude toward the stator core 24 so as to restrain the stator core 24 from being inclined in the directions T away from the axis CL toward the respective fastened portions 34a, 34b, 34c.

Owing to the above-described construction, it is possible to effectively restrain, by the plurality of protrusion portions 42, the inclination of the stator core 24 that is constituted by the steel sheets 32 that are laminated on each other, in the directions T toward the respective fastened portions 34 (to each of which the axial force is to be applied from a corresponding one of the fastening bolts 38), which could be a large inclination. Further, in place of providing the cover 14 with a protrusion portion that is closed to the outer circumferential surface 24a of the stator core 24 over its entire periphery, the plurality of protrusion portions 42 can be provided in respective effective positions, so that it is possible to assure the sufficient space E2 between the cover 14 and the above-described other axial end portion 24c of the stator core 24. Therefore, it is possible to maintain a high degree of freedom in arrangement of the terminals 40 such as coil terminal and neutral line terminal that are required for the stator oil 22.

In the present embodiment, each of the protrusion portions 42a, 42b, 42c is located, in the circumferential direction R, between corresponding adjacent two of the fastened portions 34 which are adjacent to each other in the circumferential direction R, such that each of the protrusion portions 42a, 42b, 42c is located in the given angular range M1 that is an angular range from one of the corresponding adjacent two of the fastened portions 34 in the circumferential direction R, wherein the given angular range M1 corresponds to one-third of the angular interval between the corresponding adjacent two of the fastened portions 34 in the circumferential direction R. Owing to this arrangement, it is possible to effectively restrain the inclination of the stator core 24 in the directions T toward the respective fastened portions 34 (to each of which the axial force is to be applied from the corresponding fastening bolt 38) can be effectively restrained by the protrusion portions 42a, 42b, 42c.

In the present embodiment, the protrusion portions 42a, 42b, 42c are provided to restrain the stator core 24 from being inclined in any of the directions T away from the axis CL toward the fastened portions 34 such that the stator core 24 is restrained, by at least one of the protrusion portions 42a, 42b, 42c, from being inclined in each of the directions T away from the axis CL toward the fastened portions 34. Owing to this arrangement, it is possible to effectively restrain the inclination of the stator core 24 in the directions T toward the respective fastened portions 34 (to each of which the axial force is to be applied from the corresponding fastening bolt 38) can be effectively restrained by the protrusion portions 42a, 42b, 42c.

In the present embodiment, any one of the protrusion portions 42 is not provided in a position in which the protrusion portion 42 is to be brought at its distal end with the center position N that is located between each adjacent two fastened portions 34 in the circumferential direction R. In other words, each of the protrusion portions 42 is located in a position that enables each protrusion portion 42 to be brought into contact at its distal end thereof with a contact portion of the outer circumferential surface 24a of the stator core 24, wherein the contact portion is located, in the circumferential direction R, between a corresponding one of the fastened portions 34 and the center position N that is located, in the circumferential direction R, between the corresponding one of the fastened portions 34 and another one of the fastened portions 34 that is adjacent, in the circumferential direction R, to the corresponding one of the fastened portions 34. Owing to this arrangement, it is possible to effectively restrain the inclination of the stator core 24 in the directions T toward the respective fastened portions 34 (to each of which the axial force is to be applied from the corresponding fastening bolt 38) can be effectively restrained by the protrusion portions 42. Further, it is possible to assure the sufficient space E2 between the cover 14 and the above-described other axial end portion 24c of the stator core 24, and accordingly to maintain a high degree of freedom in arrangement of the terminals 40 such as coil terminal and neutral line terminal that are required for the stator oil 22.

Second Embodiment

There will be described other embodiments of this invention. The same reference signs as used in the above-described embodiment will be used in the following embodiments, to identify the functionally corresponding elements, and descriptions thereof are not provided.

Figure 5:
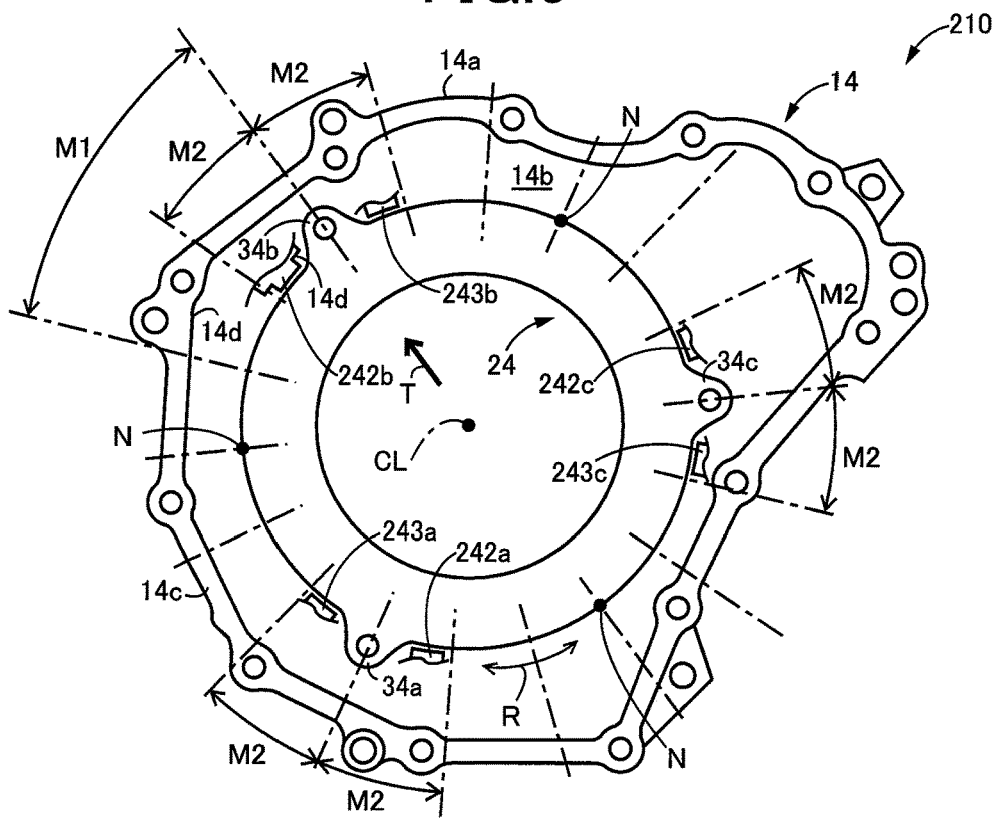
FIG. 5 is a transverse sectional view corresponding to the view of FIG. 3, and showing a vehicle electric motor according to another embodiment of the present invention.

FIG. 5 is a transverse sectional view corresponding to the view of FIG. 3, and showing an electric motor 210 according to a second embodiment of the present invention. In this second embodiment, three pairs of protrusion portions 242a, 243a, 242b, 243b, 242c, 243c (hereinafter simply referred to as "protrusion portions 242, 243" unless they are to be distinguished from one another) are provided to protrude from respective portions of the inner wall surface 14d of the cover 14 which surround the stator core 24, toward the stator core 24. Each pair of the protrusion portions 242, 243 consists of the protrusion portion 242 and the protrusion portion 243 that are adjacent to each other in the circumferential direction R. The protrusion portion 242 of each pair of the protrusion portions 242, 243 is located to be adjacent to a corresponding one of the fastened portions 34 in the circumferential direction R, and is provided in a given angular range M2 on the inner wall surface 14d, wherein the given angular range M2 is an angular range from the corresponding one of the fastened portions 34 in the circumferential direction R, and corresponds to one-sixth of the angular interval between the corresponding fastened portion 34 and another one of the fastened portions 34 that is adjacent to the corresponding fastened portions 34 in the circumferential direction R, namely, wherein the given angular range M2 is one of six angular ranges into which the angular interval of 120° between the adjacent two fastened portions 34 is equally divided, and the one of the six angular ranges is adjacent to the corresponding fastened portions 34. Meanwhile, the protrusion portion 243 of each pair of the protrusion portions 242, 243 is located to be adjacent to the above-described corresponding fastened portions 34 in the circumferential direction R, and is provided in the given angular range M2 on the inner wall surface 14d, such that the protrusion portion 243 is located on one of opposite sides of the above-described corresponding fastened portions 34 in the circumferential direction R, which is remote from the protrusion portion 242. That is, in the present embodiment, each pair of the protrusion portions 242, 243 are located in an angular range of ±20° from a corresponding one of the fastened portions 34.

Further, each pair of the protrusion portions 242, 243 protruding from the inner wall surface 14d are provided in respective opposite sides of a corresponding one of the fastened portions 34 in the circumferential direction R, and sandwich the corresponding one of the fastened portions 34 in the circumferential direction R, such that the pair of protrusion portions 242, 243 are located in respective positions that are symmetrical with each other with respect to the corresponding fastened portion 34 in the circumferential direction R. That is, the pair of protrusion portions 242a, 243a adjacent to each other in the circumferential direction R are symmetrical with each other with respect to the fastened portion 34a in the circumferential direction R. The pair of protrusion portions 242b, 243b adjacent to each other in the circumferential direction R are symmetrical with each other with respect to the fastened portion 34b in the circumferential direction R. The pair of protrusion portions 242c, 243c adjacent to each other in the circumferential direction R are symmetrical with each other with respect to the fastened portion 34c in the circumferential direction R. Thus, the inclination of the stator core 24 in each one of the directions T away from the axis CL toward the respective fastened portions 34 is restrained by a corresponding one of the pairs protrusion portions 242, 243.

Further, each pair of protrusion portions 243, 242 are provided, in the circumferential direction R, between corresponding adjacent two of the fastened portions 34 which are adjacent to each other in the circumferential direction R. That is, each pair of protrusion portions 243, 242 protrude from respective portions of the inner wall surface 14d that are opposed, in the radial direction, to respective portions of the outer circumferential surface 24a of the stator core 24 which are located between the corresponding adjacent two of the fastened portions 34 in the circumferential direction R. Each pair of protrusion portions 243, 242 are located in respective positions that are symmetrical with each other with respect to a line connecting between the axis CL and the center position N that is located between the corresponding adjacent two fastened portions 34 in the circumferential direction R. Specifically, the protrusion portions 243a, 242b as one of pairs of protrusion portions 243, 242 are provided, in the circumferential direction R, between the fastened portions 34a, 34b, and located in respective positions that are symmetrical with each other with respect to the line connecting between the axis CL and the center position N that is located between the fastened portions 34a, 34b in the circumferential direction R. The same description can be applied also to the other pairs of protrusion portions 243, 242 in the form of the protrusion portions 243b, 242c and the protrusion portions 243c, 242a.

As described above, in the present second embodiment, each pair of the protrusion portions 242, 243 are provided in respective opposite sides of a corresponding one of the fastened portions 34 in the circumferential direction R, and sandwich the corresponding one of the fastened portions 34 in the circumferential direction R, such that the pair of protrusion portions 242, 243 are located in the respective positions that are symmetrical with each other with respect to the corresponding fastened portion 34 in the circumferential direction R. Owing to this arrangement, it is possible to effectively restrain the inclination of the stator core 24 in each one of the directions T toward the respective fastened portions 34 (to each of which the axial force is to be applied from a corresponding one of the fastening bolts 38) can be effectively restrained by the corresponding pair of protrusion portions 242, 243.

In the present second embodiment, each pair of the protrusion portions 242, 243 are provided, in the circumferential direction R, between corresponding adjacent two of the fastened portions 34 which are adjacent to each other in the circumferential direction R, such that the pair of protrusion portions 242, 243 are located in respective positions that are symmetrical with each other with respect to a line connecting between the axis CL and the center position N that is located, in the circumferential direction R, between the corresponding adjacent two of the fastened portions 34. Owing to this arrangement, it is possible to effectively restrain the inclination of the stator core 24 in each one of the directions T toward the respective fastened portions 34 (to each of which the axial force is to be applied from a corresponding one of the fastening bolts 38) can be effectively restrained by the corresponding pair of protrusion portions 242, 243.

Third Embodiment

Figure 6:
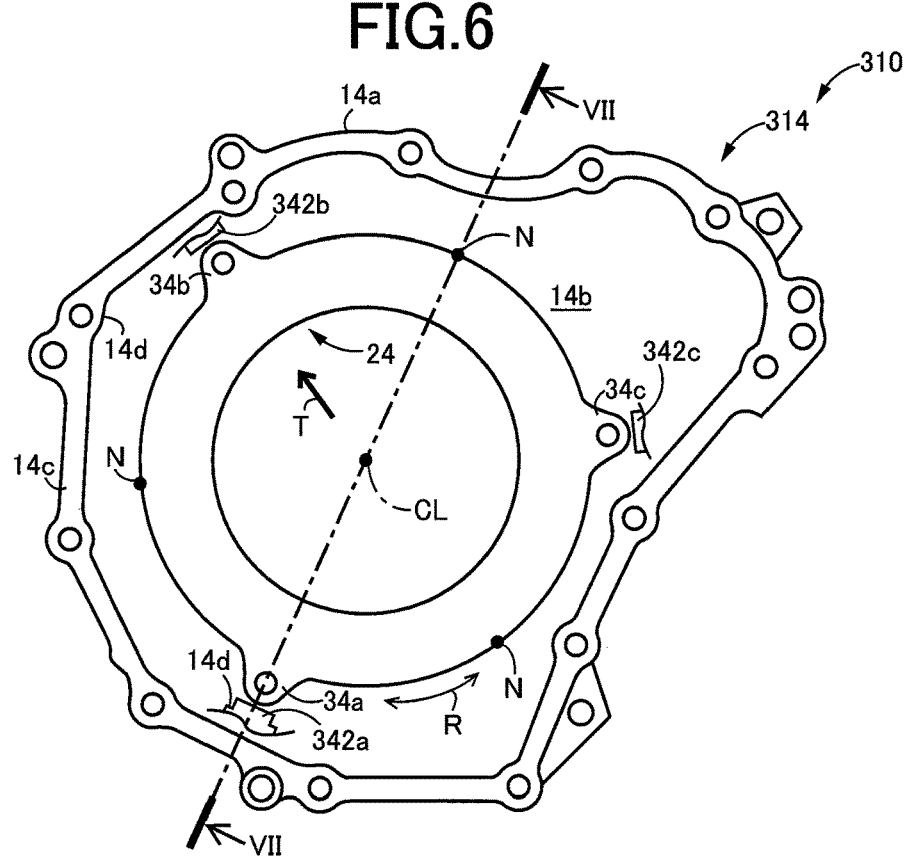
FIG. 6 is a transverse sectional view corresponding to the view of FIG. 3, and showing a vehicle electric motor according to still another embodiment of the present invention.
Figure 7:
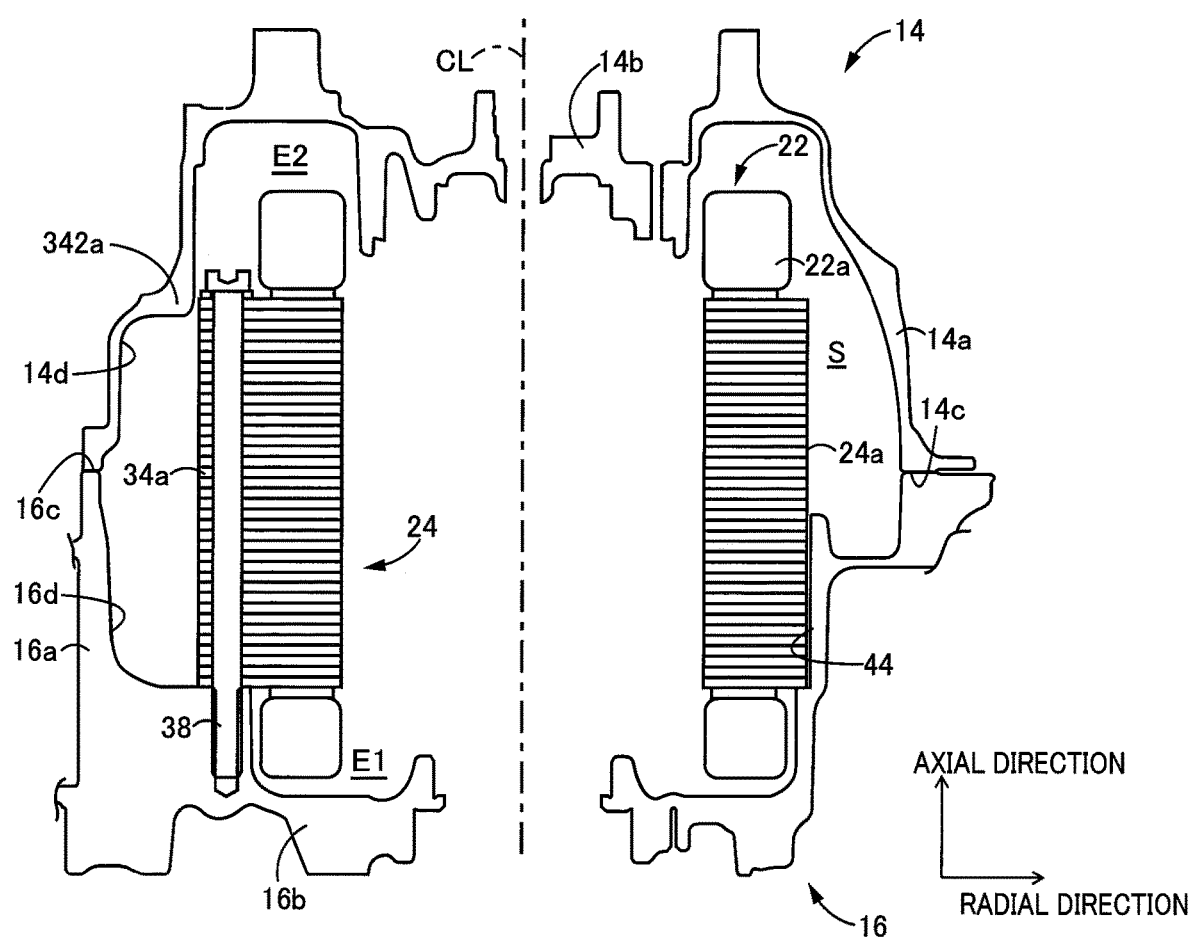
FIG. 7 is a longitudinal sectional view showing a cross section taken along line VII-VII indicated in FIG. 6.

FIG. 6 is a transverse sectional view corresponding to the view of FIG. 3, and showing an electric motor 310 according to the third embodiment of the present invention. FIG. 7 is a longitudinal sectional view showing a cross section taken along line VII-VII indicated in FIG. 6. It is noted that the rotor 12 and the bearings 28, 30 38 are not illustrated in FIG. 7. In this third embodiment, a plurality of protrusion portions 342a, 342b, 342c (hereinafter simply referred to as "protrusion portions 342" unless they are to be distinguished from one another) are provided in respective portions of the inner wall surface 14d of the cover 14 which surround the stator core 24 and which are opposed to the respective fastened portions 34 with a given distance between each of the protrusion portions 342a, 342b, 342c and a protruding end of a corresponding one of the fastened portions 34 in the radial direction. The protrusion portions 342a, 342b, 342c protrude from the respective portions of the inner wall surface 14d toward the respective portions 34. The above-described given distance is smaller than a distance between the inner wall surface 14d of the cover 14 and non-fastened portions of the inner wall surface 14d of the cover 14 (in which the fastened portions 34 are not provided). Owing to the arrangement, when the stator core 24 is inclined toward any one of the directions T toward the respective fastened portions 34 to each of which an axial force is applied from a corresponding one of the fastening bolts 38, a corresponding one of the protrusion portions 342 is brought into contact at its distal end with the protruding end of a corresponding one of the fastened portions 34 whereby the inclination of the stator core 24 is restrained. Specifically, when the stator core 24 is inclined toward the direction T toward the fastened portion 34a, the protrusion portion 342a is brought into contact at its distal end with the fastened portion 34a whereby the inclination of the stator core 24 is restrained. Similarly, when the stator core 24 is inclined toward the direction T toward the fastened portion 34b, the protrusion portion 342b is brought into contact at its distal end with the fastened portion 34b. When the stator core 24 is inclined toward the direction T toward the fastened portion 34c, the protrusion portion 342c is brought into contact at its distal end with the fastened portion 34c.

As described above, in the present third embodiment, each of the protrusion portions 342 is to be brought into contact at its distal end with a corresponding one of the fastened portions 34 so as to restrain the stator core 24 from being inclined. Owing to this arrangement, it is possible to effectively restrain the inclination of the stator core 24 in each one of the directions T toward the respective fastened portions 34 (to each of which the axial force is to be applied from a corresponding one of the fastening bolts 38) can be effectively restrained by the corresponding one of the protrusions 342.

Fourth Embodiment

Figure 8:
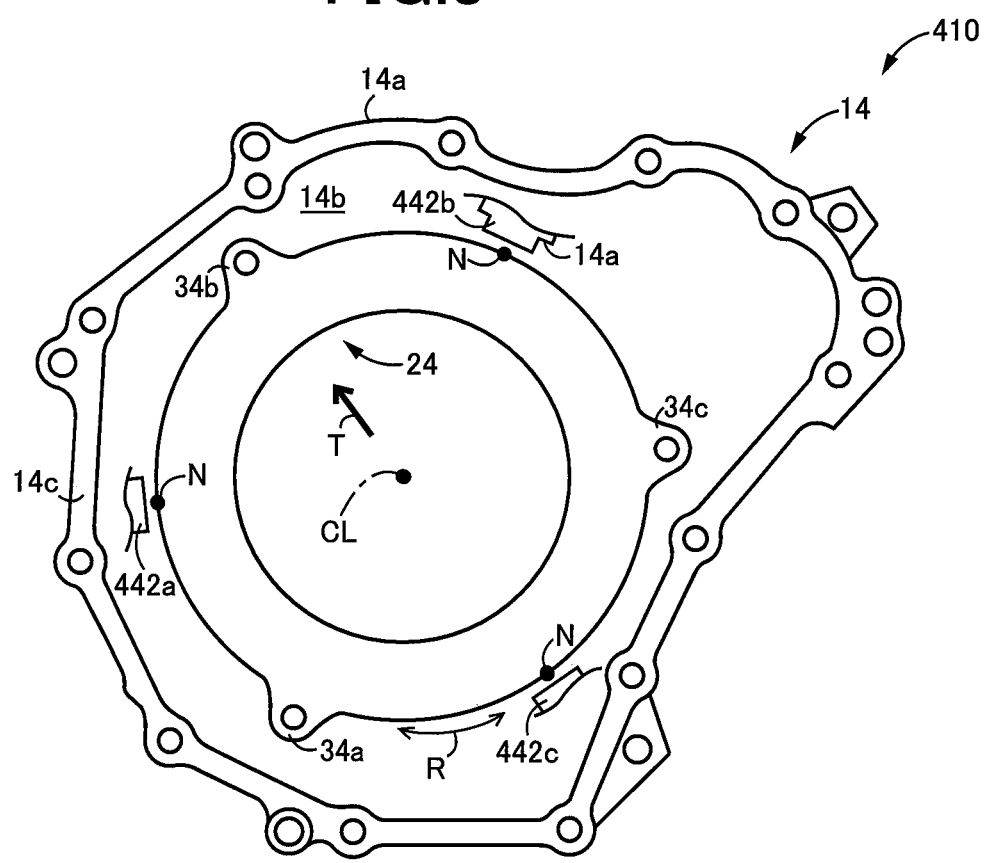
FIG. 8 is a transverse sectional view corresponding to the view of FIG. 3, and showing a vehicle electric motor according to still another embodiment of the present invention.

FIG. 8 is a transverse sectional view corresponding to the view of FIG. 3, and showing an electric motor 410 according to a fourth embodiment of the present invention. In this fourth embodiment, a plurality of protrusion portions 442a, 442b, 442c (hereinafter simply referred to as "protrusion portions 442" unless they are to be distinguished from one another) are provided in respective portions of the inner wall surface 14d of the cover 14 which surround the stator core 24, such the inclination of the stator core 24 is restrained with one of the protrusion portions 442a, 442b, 442c being brought into contact at it distal end with a portion of the outer circumferential surface 24a of the stator core 24, which is located in the center position N that is between the fastened portions 34 in the circumferential direction R. In the fourth embodiment, each of the protrusion portions is more distant from a corresponding one of the fastened portions 34 in the circumferential direction R, than in the above-described first through third embodiments. However, since a plurality of protrusion portions in the form of the protrusion portions 442a, 442b, 442c are provided in the cover 14, the inclination of the stator core 24 can be restrained while assuring a sufficient space defined between the cover 14 and the axial end portion 24c of the stator core 24.

While the preferred embodiments of this invention have been described in detail by reference to the drawings, it is to be understood that the invention may be otherwise embodied.

For example, in the first through fourth embodiments, the plurality of fastened portions 34 consist of three fastened portions 34 which are provided in respective three portions of the outer circumferential surface 24a of the stator core 24 and which are equi-angularly spaced apart from each other at the angular interval of 120°. However, the arrangement of the fastened portions 34 may be modified such that the number of the fastened portions 34 is two, five or other number that is other than three. Further, the fastened portions 34 may be non-equi-angularly spaced apart from each other at a non-constant angular interval. In such a modification, too, the inclination of the stator core 24 in any of the directions T away from the axis CL toward the respective fastened portions 34 is effectively restrained by the provision of the protrusion portions in the cover 14.

In the above-described first embodiment, the plurality of protrusion portions 42 consist of four protrusion portions 42 provided on the inner wall 14d of the cover 14. However, the number of the protrusion portions 42 may be at least two, and may be six or nine.

In the above-described first through fourth embodiments, any one or ones of the protrusion portions 42a-42d, protrusion portions 242a-242c, protrusion portions 243a-243c, protrusion portions 342a-342c and protrusion portions 442a-442c may be provided in combination with any one or ones of the others. For example, in the first embodiment, the protrusion portion 42a may be replaced by the protrusion portions 242a, 243a shown in FIG. 5, the protrusion portion 342a shown in FIG. 6 or the protrusion portion 442a shown in FIG. 8. Further, for example, in the first embodiment, the protrusion portion 42b may be replaced by the protrusion portions 242b, 243b, the protrusion portion 42c may be replaced by the protrusion portion 342c, and/or the protrusion portion 42d may be replaced by the protrusion portion 442c. Moreover, in the above-described first through fourth embodiments, the stator core 24 is fastened to the bottom wall 16b of the casing 16 through the fastening bolts 38. However, the stator core 24 may be fastened to the bottom wall 14b of the cover 14 through the fastening bolts 38. In this case, the protrusion portions are provided on the inner wall surface 16d of the casing 16, and the stator-core positioning portion 44 is provided on the inner wall surface 14d of the cover 14.

It is to be understood that the embodiments described above are given for illustrative purpose only, and that the present invention may be embodied with various modifications and improvements which may occur to those skilled in the art.

NOMENCLATURE OF ELEMENTS

10; 210; 310; 410: electric motor (vehicle electric motor)
12: rotor
12a: outer circumferential surface
14: cover (casing cover)
14a: outer circumferential surface
14d: inner wall surface
16: casing
16a: outer circumferential surface
16b: bottom wall
24: stator core
24a: outer circumferential surface
24b: axial end portion
24c: other axial end portion
32: steel sheet
34: fastened portion
38: fastening bolt
42; 242; 243; 342; 442: protrusion portion
CL: axis
M1: angular range
M2: angular range
N: center position

What is claimed is:

1. A vehicle electric motor comprising:

a tubular-shaped stator core constituted by a plurality of steel sheets that are laminated on each other;

a casing including an outer circumferential wall and a bottom wall, and storing therein one of opposite end portions of said stator core which are opposite to each other in an axial direction of said stator core;

a casing cover including an outer circumferential wall and a bottom wall, and storing therein the other of said opposite end portions of said stator core, said casing cover being fixed to said casing; and a rotor disposed inside said stator core so as to be rotated about an axis of said stator core, wherein said stator core includes a plurality of fastened portions provided in respective portions of an outer circumferential surface of said stator core which are spaced apart from each other in a circumferential direction of said stator core, said fastened portions protruding outwardly in a radial direction of said stator core, said stator core being fastened at said fastened portions to said bottom wall of one of said casing and said casing cover, through fastening bolts that pass through said fastened portions in said axial direction, wherein the other of said casing and said casing cover includes a plurality of protrusion portions provided in respective portions of an inner wall surface of said other of said casing and said casing cover which surround said stator core, said protrusion portions protruding toward said stator core so as to restrain said stator core from being inclined in directions away from said axis toward said fastened portions, and wherein said protrusion portions include a pair of protrusion portions that are provided in respective opposite sides of each of said fastened portions in said circumferential direction, such that said pair of protrusion portions are located in respective positions that are symmetrical with each other with respect to said each of said fastened portions in said circumferential direction.

2. The vehicle electric motor according to claim 1,
wherein said protrusion portions includes a protrusion portion that is located, in said circumferential direction, between adjacent two of said fastened portions which are adjacent to each other in said circumferential direction, such that said protrusion portion is located in a given angular range from one of said adjacent two of said fastened portions in said circumferential direction, said given angular range corresponding to one-third of an angular interval between said adjacent two of said fastened portions in said circumferential direction.

3. The vehicle electric motor according to claim 1,
wherein each of said protrusion portions is to be brought into contact at a distal end thereof with said outer circumferential surface of said stator core, and is located in a position that enables said each of said protrusion portions to be brought into contact at said distal end thereof with a contact portion of said outer circumferential surface of said stator core, said contact portion being located, in said circumferential direction, between a corresponding one of said fastened portions and a center position that is located, in said circumferential direction, between said corresponding one of said fastened portions and another one of said fastened portions that is adjacent, in said circumferential direction, to said corresponding one of said fastened portions.

4. The vehicle electric motor according to claim 1,
wherein said protrusion portions are provided to restrain said stator core from being inclined in any of said directions away from said axis toward said fastened portions, such that said stator core is restrained, by at least one of said protrusion portions, from being inclined in each of said directions away from said axis toward said fastened portions.

5. The vehicle electric motor according to claim 1,
wherein said protrusion portions include a pair of protrusion portions that are provided, in said circumferential direction, between each adjacent two of said fastened portions which are adjacent to each other in said circumferential direction, such that said pair of protrusion portions are located in respective positions that are symmetrical with each other with respect to a line connecting between said axis and a center position that is located, in said circumferential direction, between said each adjacent two of said fastened portions.

6. The vehicle electric motor according to claim 1,
wherein each of said protrusion portions is to be brought into contact at a distal end thereof with a corresponding one of said fastened portions so as to restrain said stator core from being inclined.

7. The vehicle electric motor according to claim 1,
wherein said protrusion portions includes at least two protrusion portions each of which is located to be adjacent to a corresponding one of said fastened portions, such that a circumferential distance between each of said at least two protrusion portions and said corresponding one of said fastened portions in said circumferential direction is not larger than a value corresponding to one-third of an angular interval between said corresponding one of said fastened portions and another one of said fastened portions that are adjacent to each other in said circumferential direction.

8. The vehicle electric motor according to claim 1,
wherein said one of said casing and said casing cover is said casing while said other of said casing and said casing cover is said casing cover.

* * * * *